Aug. 1, 1939.  J. STELLITANO  2,168,055
MILK CAN FILLER
Filed March 26, 1938   5 Sheets-Sheet 1
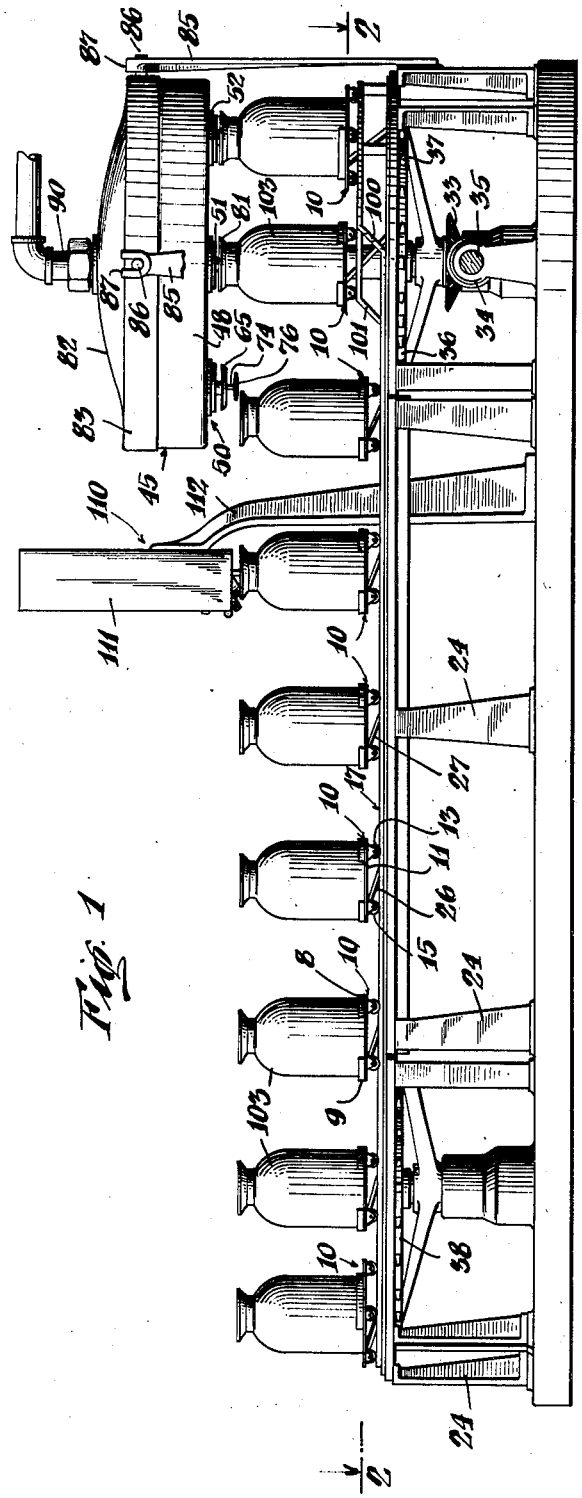
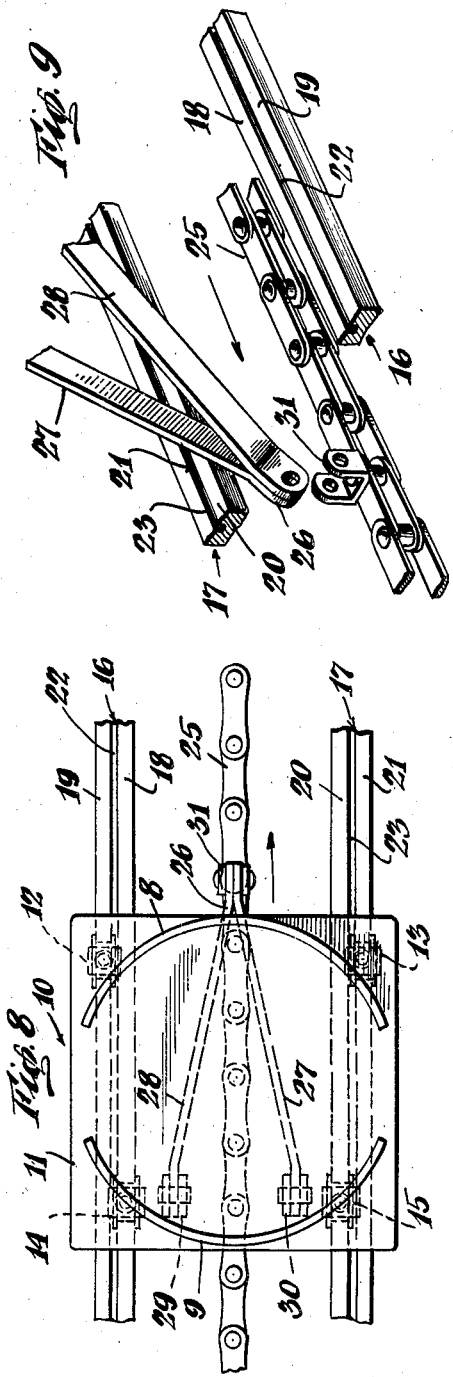
INVENTOR
Joseph Stellitano
BY
Furman Rinehart
his ATTORNEY Aug. 1, 1939.   J. STELLITANO   2,168,055
MILK CAN FILLER
Filed March 26, 1938   5 Sheets-Sheet 2
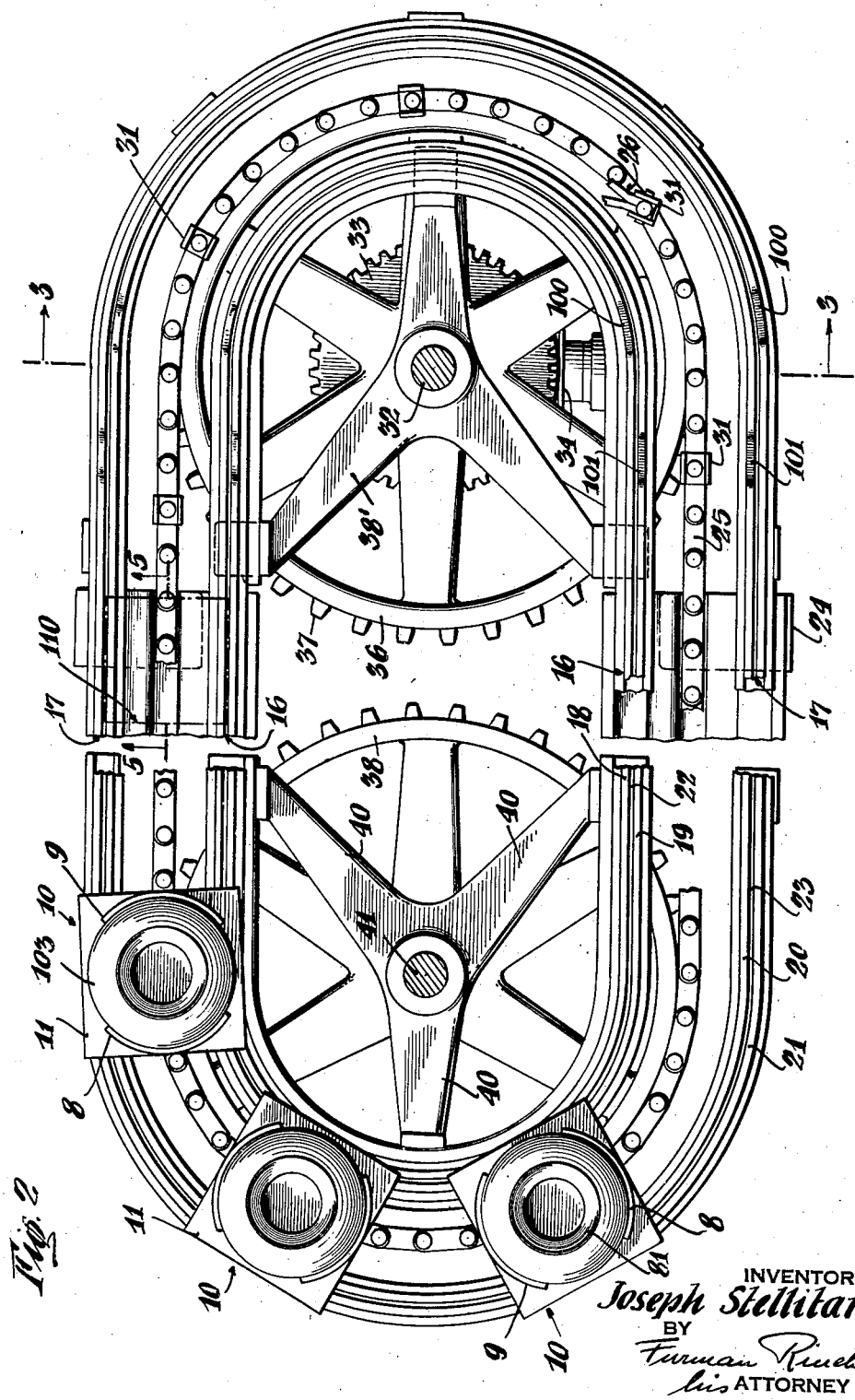

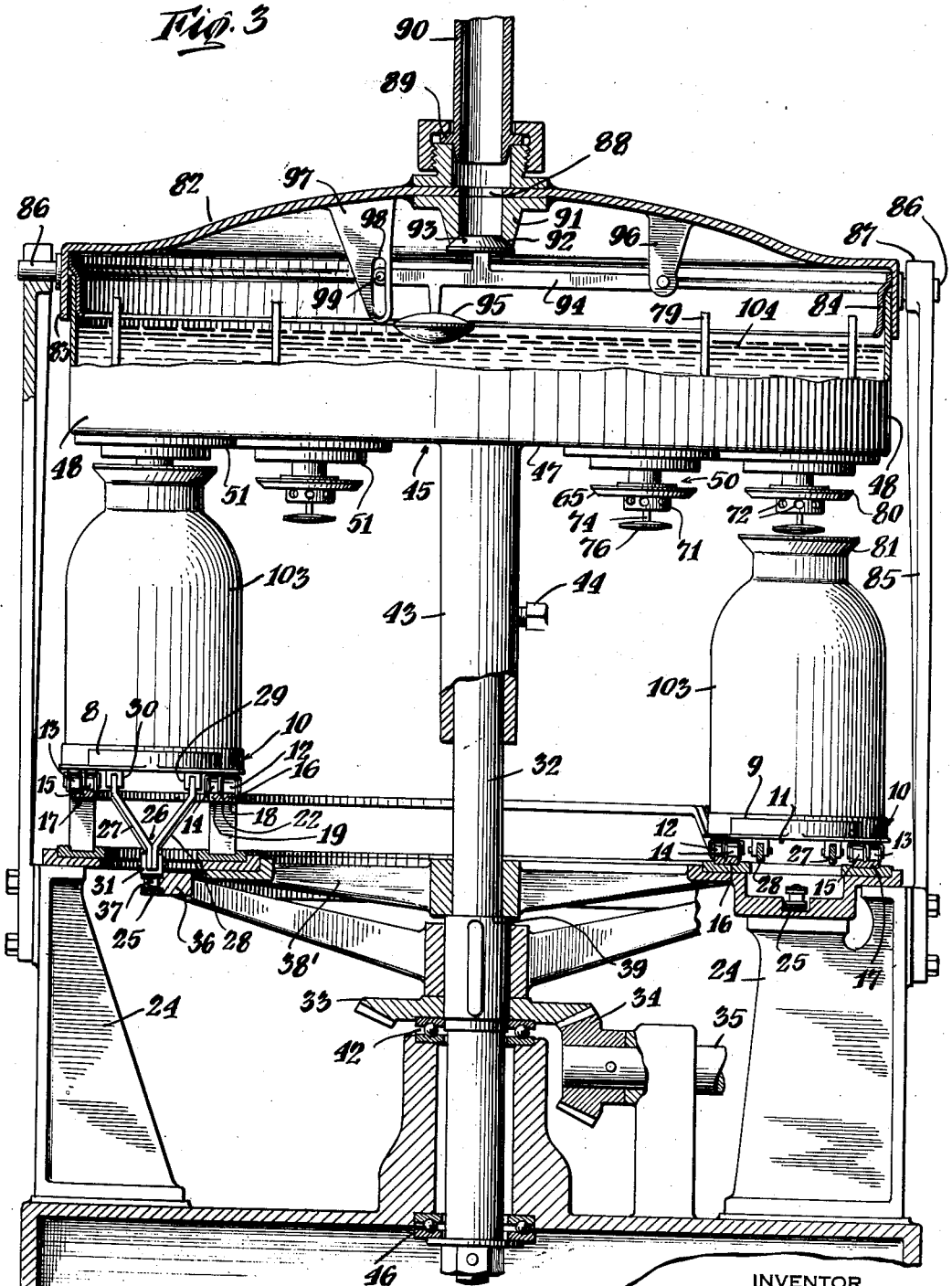

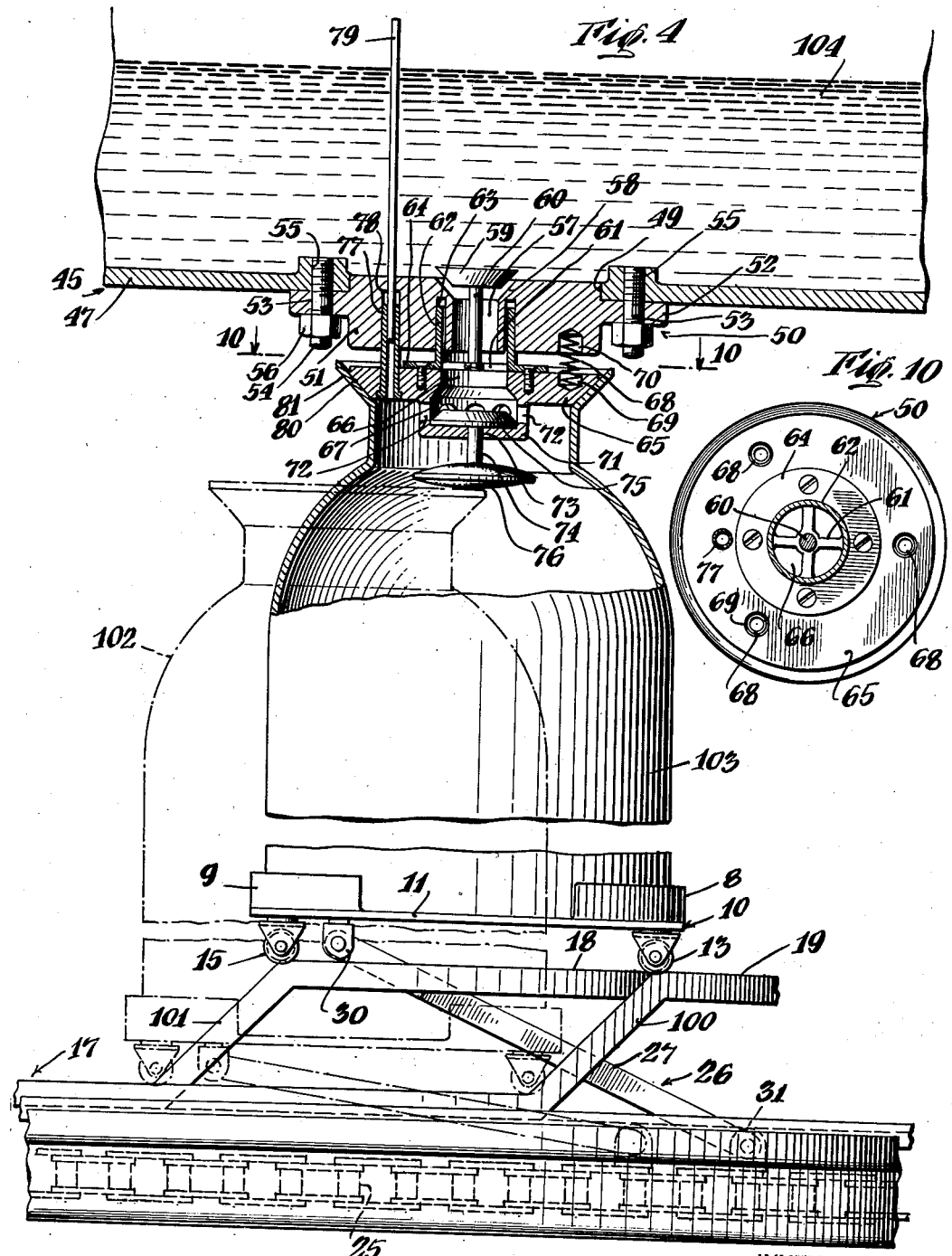

Aug. 1, 1939.   J. STELLITANO   2,168,055
MILK CAN FILLER
Filed March 26, 1938   5 Sheets-Sheet 5
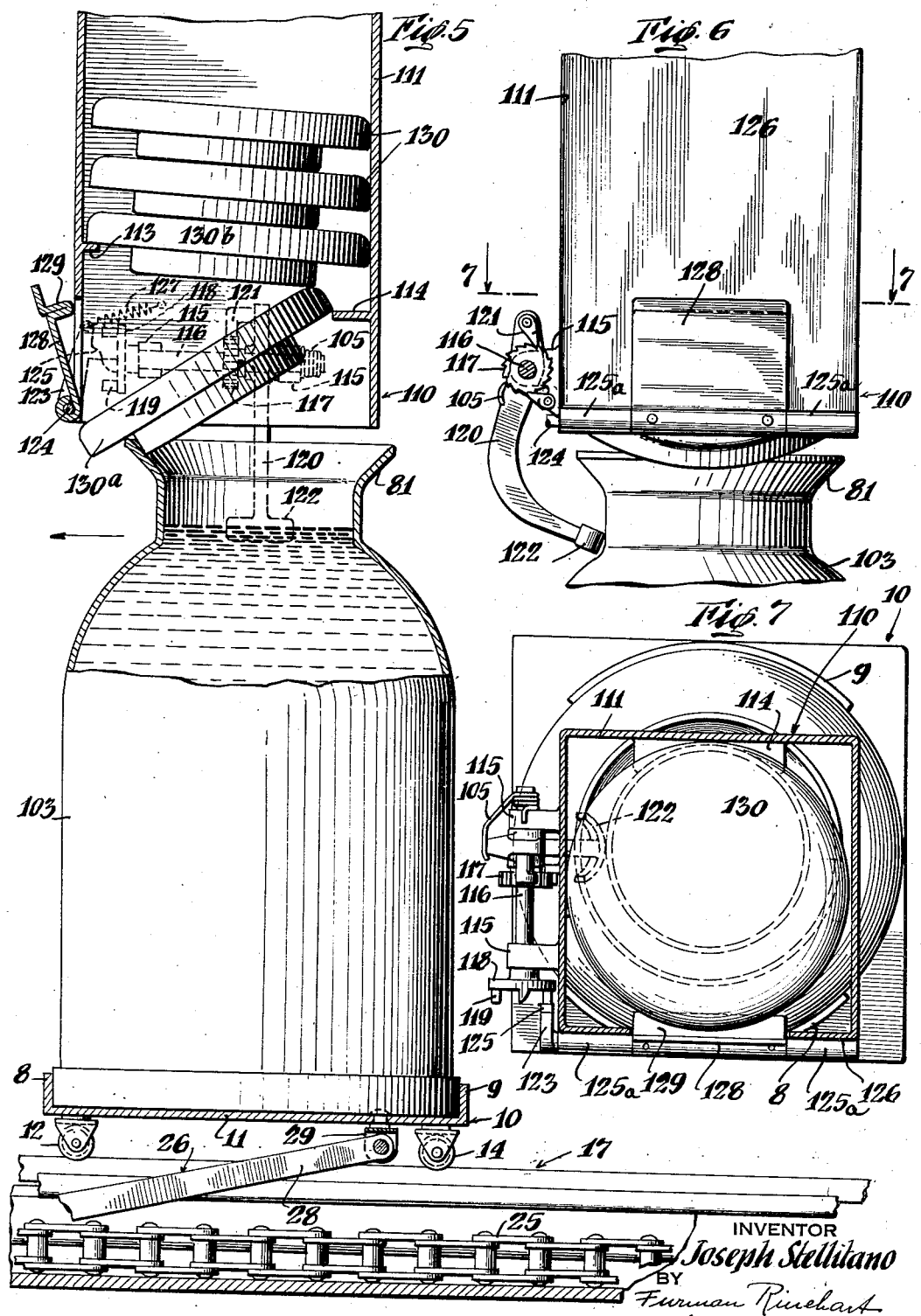
INVENTOR
Joseph Stellitano
BY
Furman Rinehart
his ATTORNEY Patented Aug. 1, 1939

2,168,055

UNITED STATES PATENT OFFICE 2,168,055

MILK CAN FILLER

Joseph Stellitano, Long Island City, N. Y.

Application March 26, 1938, Serial No. 198,185

11 Claims. (Cl. 226—98)

This invention relates to can fillers and more particularly to a machine for automatically filling large milk cans with a predetermined quantity of milk.

In the daily distribution of milk, particularly in the larger metropolitan centers, the milk is usually collected from the producers and delivered promptly to central dairy plants where it is pasteurized. Normally, the milk is pasteurized in bulk and then distributed in suitable containers. For home use the pint and quart size bottles are most common. For users of greater quantities, such as hotels and restaurants, it is often more feasible to deliver the milk in large metal cans. The standard size for this trade is the forty quart capacity.

To insure distribution of fresh milk to the consumer, the milk should be delivered as soon as possible after its production. One step in the distributive system requires filling of the forty quart containers or so-called standard metal cans in great numbers after pasteurization at the central plant. It has been common practice in many of the larger central dairy plants to fill the forty quart cans by hand or manual methods. This practice is undesirable because of the number of workers required, the loss of time incident to hand filling by ordinary valves and likewise loss to the dairyman because the workers sometimes become careless and charge the large cans with a greater quantity of milk than is requisite. Furthermore, the foam which forms on the surface of the milk as it is charged to the large cans becomes bothersome and this often results in a messy condition in the vicinity of the filling operations.

The present invention obviates these undesirable incidents by providing a machine comprising in general an endless conveyor upon which empty cans to be filled are carried to a turret chamber equipped with a plurality of specially designed charging valves. The conveyor is operated in timed relation with the revolving turret chamber and as each can reaches the rotating charging chamber the mouth of the can engages a charging valve which is actuated by the movement of the can thus to open the valve and permit the can to be filled with milk from the rotating chamber as the can moves in an arc about the center of rotation of the chamber.

Each valve is provided with a float adapted to be actuated by the milk in the can when it reaches a predetermined level thus to shut off further flow of milk from the chamber to the can. Means are provided to vent the space above the surface of the milk so that any foam which is formed is kept within the can yet it will not affect the float because of insufficient buoyancy.

Means are provided to disengage the mouth of the can from the valve after each can is filled with a predetermined quantity of milk in its travel with the turret which disengagement causes the valve by reason of its special construction to close and remain closed until it again is engaged by another empty can travelling to the turret on the continuous conveyor.

Means are provided along the conveyor and coactive with a filled can travelling thereon whereby the can covers may be automatically placed in the mouths of the cans as each filled can passes in its path of travel in the machine.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which:

Fig. 1 is a general view in side elevation of the machine with certain parts broken away;

Fig. 2 is a view on line 2—2 of Fig. 1 with a part broken out;

Fig. 3 is a view in elevation and partly in cross-section on lines 3—3 of Fig. 2;

Fig. 4 is a view in larger scale showing details of the valve construction and track arrangement to elevate the empty cans to actuate the valve;

Fig. 5 is a view also in larger scale showing the mechanism to place covers on the filled cans;

Fig. 6 is a view at right angles to Fig. 5 of the cover handling mechanism;

Fig. 7 is a view on line 7—7 of Fig. 6;

Fig. 8 is a plan view of a carriage platform adapted to carry a can;

Fig. 9 is an exploded view in perspective showing the manner of connecting the carriage platform to the conveyor link chain; and Fig. 10 is a view on line 10—10 of Fig. 4.

In the following description and in the claims, various details will be identified by specific names for convenience, but they are intended to be as generic in their application as the art will permit. Like reference characters denote like parts in the several figures of the drawings.

Referring to the drawings a plurality of equally spaced apart carriages 10, each comprising a platform 11 carried on two front pivotally mounted track wheels 12 and 13 and two rear pivotally mounted track wheels 14 and 15 are adapted to ride on a pair of oval tracks 16 and 17. Two arcuate cam retaining clamps 8 and 9 are fixed to the platform 11 to retain a forty quart milk can rigidly thereon. Each track is in the nature of a double track; the inside track 16 having an inner trackway 18 and an outer trackway 19; defining a groove 22; the outside track 17 having an inner trackway 20 and an outer trackway 21 defining a groove 23. The tracks 16 and 17 are mounted on suitable supports 24.

Each carriage 10 is connected to a continuous link chain 25 by means of a bifurcated V-shaped tongue 26 having arms 27 and 28. The separated ends are mounted to the carriage platform by pivotal mountings 29 and 30. The joined ends of arms 27 and 28 (see Figs. 8 and 9) are connected to the sprocket chain by a pivotal mounting 31.

In the center of the arcuate portion at one end of the machine is a rotatably mounted vertical shaft 32. Fixed to this shaft 32 (see Fig. 3) is a bevel gear 33 engaging a bevel pinion 34 in turn fixed to a drive shaft 35 which may be caused to rotate by a prime mover (not shown). Also fixed to the shaft 32 is a sprocket wheel 36 having sprocket teeth 37 which engage the endless sprocket chain 25. At the opposite end of the machine and in the center of the arcuate portion of the tracks 16 and 17 is a rotatably mounted sprocket wheel 38 to guide the sprocket chain 25.

From the description thus far it will be observed that rotation of the shaft 35 will cause rotation of pinion 34 which in turn will cause rotation of the vertical shaft 32. This causes the gear wheel 36 to rotate, causing the sprocket chain 25 to travel and thus carry the can carriages 10 around the oval tracks 16 and 17. A spider having arms 38' mounted on the shaft 32 but not to rotate with it and resting on the shoulder 39 assists in maintaining the inside track 16 rigidly fixed at its arcuate portion. A similar spider having arms 40 and similarly mounted on shaft 41 at the opposite end of the oval track maintains that arcuate portion of the inside track rigidly fixed.

Also mounted on the rotatable shaft 32, the weight of which is carried on suitable bearings 42 and 46, (see Fig. 3), is a sleeve 43 fixed to the shaft by means of a key or set screw 44. Mounted on the sleeve 43 is a turret charging chamber designated generally by reference character 45. This chamber comprises a bottom wall 47 and a cylindrical side wall 48.

The bottom wall 47 has a plurality of openings 49 circumferentially positioned from the center or axis of rotation of the charging chamber 45 and equally spaced apart. Each opening 49 is provided with a valve mechanism which is presently described.

The valve mechanism designated generally by the reference character 50 comprises a disc shaped head 51 (see Fig. 4) designed to snugly fit within the opening 49. The head 51 has an annular laterally extending flange 52 provided with a plurality of openings 53 through which may be extended screw bolts 54 screwed into threaded openings 55 in the bottom wall 47 of the charging chamber 45. The valve head 51 may be securely fixed to the bottom wall 47 by nuts 56.

The valve head 51 is provided with a central opening 57 the upper portion of which is beveled to provide a seat 58 for a downwardly disposed complementary stopper 59. This valve head stopper 59 has a downwardly depending stem 60 which has a spider 61 fixed at its lower end. The spider 61 is in turn fixed to a splash ring 62 which is slidable vertically in an annular groove 63 in the valve head 51. The splash ring 62 is provided with a laterally extending annular flange 64 which may be fixed to the valve plug 65.

The valve plug 65 is provided with an opening 66 the lower portion of which is defined by an upwardly disposed bevel seat 67. A plurality of coil springs 68 seated in spring seats 69 and 70 urges the valve plug downwardly, thus causing the stopper 59 to engage the seat 58 and close the opening until the force of the springs is overcome and the valve plug 65 is raised since the stem 60 is fixed to this plug.

Dependent from the valve plug 65 is a bracket 71 having ports 72 and also providing a journal 73 through which the lower stopper stem 74 may slide. This stopper stem is fixed at its upper end to a lower stopper 75 upwardly disposed and complementary to seat 67. The lower end of stem 74 is fixed to a float 76. It will be observed that if the float is caused to move upwardly the lower stopper 75 will ultimately engage the seat 67 and close the opening 66.

The valve plug 65 is also provided with a vent tube 77 slidable in an opening 78 in the valve head 51. The vent tube 77 also provides a sleeve in which is snugly slidable a second vent tube 79 fixed in the valve head 51 and which extends to the upper portion above the liquid level of milk in the charging chamber 45. As will be pointed out more in detail hereinafter this vent arrangement is of extreme importance in avoiding any nuisance from foam formed on the milk during the charging operation. It will be observed that the valve plug 65 is beveled at its periphery 80 and is complementary to the flared mouth 81 of the standard metal can.

The rotatable charging member 45 is provided with a dome shaped cover 82 having a depending apron 83 (see Fig. 3) which fits over the cylindrical sidewall 48. A splash guard 84 is fixed to the cover and extends into the interior of the chamber 45 to prevent undesirable splashing of milk from the rotating chamber. The chamber cover is independently supported by supporting arms 85 fixed to the frame. Lugs 86 extending laterally from apron 83 rest in yokes 87, thus providing easy removal of the cover for cleaning the chamber and other parts therein. The dome 82 is provided with an opening 88. A packing gland 89 is provided through which may be tightly held a pipe 90 through which milk from a suitable source may be charged into the chamber 45. An annular ring 91 providing a stopper seat 92 is also fixed to the dome. A stopper plug 93 is mounted on a lever 94 which is provided with a float 95. The lever is pivoted on a depending bracket 96 and a bracket 97 provided with a slot 98 accommodating a pin 99 limits the movement of the float 95. It will be observed that the float 95 may be used to maintain a constant level of milk in the chamber 45 even though there be a pressure in the conduit 90.

To provide actuation of the charging valve mechanism the tracks 16 and 17 which comprise trackways 18 and 19, and 20 and 21 are split through their arcuate portions beneath the rotatable chamber 45. Trackways 19 and 21 carrying the front wheels 12 and 13 of the carriage 10 have inclined portions 100 and trackways 19 and 20 carrying the rear wheels 14 and 15 have inclined portions 101. Thus when the carriage 10 is pulled along the tracks by the tongue 26 which is connected to the sprocket chain 25, an empty milk can on the carriage as indicated in dot-dash lines 102 (see Fig. 4) will be caused to rise abruptly. The flared mouth 81 of the milk can 103 will engage the valve plug 65 causing it to rise with consequent lifting of the stopper 59. Milk 104 in the chamber 45 will flow through the ports 72 into the can.

The can and valve mechanism will move around the arcuate portion of the trackways simultaneously with the same angular velocity because both the chamber 45 and the sprocket wheel 36 driving the chain 25 are operated from the same vertical shaft 32. The trackways 18, 19, 20 and 21 continue in an elevated position around their arcuate portion beneath the chamber 45. On the opposite side from the upwardly inclined portions 100 and 101 (see Fig. 1) there are corresponding downwardly inclined portions. Consequently the can 103 which will have been filled to the proper level with milk will be disengaged from the valve charging mechanism, thus causing the plug 65 to return to its downward position with resultant closing of the opening 57 by the stopper 59.

To avoid over filling and to insure a proper quantity of milk to be charged into the can in its arcuate movement under the rotary charging chamber 45 the float 76 will shut off the flow of milk when the liquid level in the can rises to a predetermined level. The foam which is formed on the milk in the can cannot escape except up through the vent 79 and if sufficient in quantity will be returned to the chamber 45.

After the can has thus been filled and is returned to the normal level of the tracks it is caused to pass and engage the cover inserting mechanism designated generally by the reference character 110. It comprises a cover holding chamber 111 supported on a standard 112. The cover chamber side walls are provided with a short cover returning lug 113 (see Fig. 5) and a longer fixed retaining shelf 114 opposite thereto. Brackets 115 are mounted on the side wall of cover chamber 111. These carry a rocker shaft 116 having fixed thereto a ratchet wheel 117 and a star or tit wheel 118 which has extending outwardly therefrom four tits 119. A rocker arm 120 is rotatably mounted on the shaft 116. The upper end of the rocker arm 120 is provided with a pivoted dog 121 which engages the ratchet wheel 117. The opposite end of the curved rocker arm 120 is provided with an arcuate shaped can engaging shoe 122. A spring 105 urges the rocker arm toward the can but the filled can passing it and engaging the shoe 122 will overcome its resistance.

It will be observed that as the filled cans pass along the tracks 16 and 17 the restricted or neck portion thereof will engage the shoe 122 and cause the rocker arm to actuate the ratchet wheel 117 through a limited arc. When the can passes and disengages the rocker arm shoe 122, it will return to normal position with the shoe ready to be actuated by the next succeeding filled can.

Since the ratchet wheel is fixed to the rocker shaft 116, the tit wheel 118 will also rotate through a limited arc. The tits 119 will engage lug 125 of a pivotally mounted arm 123 fixedly mounted on a rocker shaft 124. This shaft 124 is rotatably mounted in suitable brackets 125a fixed to the side wall 126 of the cover chamber.

A tension spring 127 urges the arm 123 toward the tit wheel 118.

Also fixedly mounted on the rocker shaft 124 is a cover dropping plate 128 having a cover retaining shelf 129. The action of the spring 127 urges the dropping plate inwardly and when the lug 125 is out of engagement with a tit 119 the plate 128 will assume a vertical position with the shelf 129 extending horizontally within the cover chamber 111.

Hence, it will be observed that when the shelf 129 is in its normal inward position the lowermost can cover 130 will be retained on the shelf 129 and the shelf 114. When a filled can passes on the tracks and engages the shoe 122 it will cause the arm 120 to rock, in turn causing the dog 121 to rotate the ratchet 117 which causes the shaft 116 to rock. This causes the tit wheel 118 to rotate in a limited arc, in turn causing a tit 119 to engage the lug 125 and rock the arm 123. This causes the shaft 124 to rock and rotate the plate 128, thus withdrawing the shelf 129 from beneath the edge of the can cover. Consequently the can cover will fall free as shown at 130a. Finally the cover 130a will fall free from the shelf 114 and into the mouth of the can as indicated in Fig. 5. The tits 119 are shaped as shown more clearly in Fig. 7. Hence, when the tit disengages the lug 125, the spring 127 causes the shelf plate 128 to retain its normal position very abruptly. The shelf 129 is returned to within the chamber in time to catch the next succeeding upper cover 130b which is falling. Cover 130b is then retained on shelf 129 and shelf 114 until the next succeeding filled can causes it to be inserted in the can which is then actuating the shoe 122.

It will be seen from the foregoing description that a fully automatic milk can filling machine is provided which may be operated continuously by placing empty forty quart cans upon the travelling carriages which travel to the rotating charging chamber where they are automatically filled with a predetermined amount of milk without muss and with exceptional speed and efficiency. Each can as it is discharged from the charging chamber will contain a proper quantity of milk. Finally, the covers may be inserted in the mouths of the cans and the milk is for all practical purposes never exposed to germs or foreign matter.

While certain novel features of the invention have been disclosed and are pointed out in the annexed claims, it will be understood that various omissions, substitutions and changes may be made by those skilled in the art without departing from the spirit of the invention.

What is claimed is:

1. A milk can filler comprising a charging chamber, a charging valve mounted in a wall of said chamber said valve having a head fixed to said wall and a vertically movable plug to fit a flared milk can mouth, means defining a central opening in said head, a stopper for said opening and a stem movable in said opening connected to said stopper and plug to close said opening when said plug is in its most downward position, means defining an annular groove in said head about said opening, a splash ring fixed to said plug and vertically movable in said groove, means normally urging said plug stem and stopper downwardly, and means to raise a milk can to cause engagement of its flared mouth with said plug and to overcome the resistance of said downwardly urging means to raise said stopper and permit milk to flow from said chamber through said opening into said can.

2. A milk can filler comprising a charging chamber, a charging valve mounted in a wall of said chamber said valve having a head fixed to said wall and a vertically movable plug to fit a flared milk can mouth, means defining a central port in said head, a stopper for said port and a stem connected to said stopper and plug and vertically movable to close said port when said plug is in its most downward position, an annular groove in said head about said port, an upwardly extending splash ring fixed to said plug and vertically slidable in said groove, means including springs normally urging said plug stem and stopper downwardly, means defining a port in said plug, and means to raise a milk can to cause engagement of its flared mouth with said plug and to overcome the resistance of said downwardly urging springs to raise said stopper and permit milk to flow from said chamber through said ports into said can.

3. A milk can filler comprising a charging chamber, a charging valve mounted in a wall of said chamber said valve having a head fixed to said wall and a vertically movable plug to fit a flared milk can mouth, means defining a central port in said head, a stopper for said port and a stem connected to said stopper and plug to close said port when said plug is in its most downward position, means including compression springs normally urging said plug stem and stopper downwardly, means defining a port in said plug, a stopper for said second mentioned port, means to raise a milk can to cause engagement of its flared mouth with said plug and to overcome the resistance of said downwardly urging springs to raise said first mentioned stopper and permit milk to flow from said chamber through said ports into said can and a float connected to said second mentioned stopper to stop the flow of milk into said can at a predetermined level.

4. A milk can filler comprising a charging chamber mounted on a vertical rotatable shaft, a plurality of circumferentially disposed charging valves mounted in the bottom wall of said chamber and equally spaced apart, a sprocket wheel mounted on said shaft, means to rotate said shaft whereby to cause said sprocket wheel and chamber to rotate with the same angular velocity, a sprocket chain trained over said sprocket, a plurality of equally spaced apart can carriages connected to said chain, each carriage being connected to said chain by means of a tongue swively mounted at its opposite ends to said carriage and chain, a plurality of carriage wheels pivotally mounted on said carriage, a pair of double tracks engaging said wheels and to support said carriages, means for raising cans supported on said carriages to engage said valves when said carriages are moved along said tracks, said valves being adapted to be opened when said cans engage said valves and are raised.

5. A milk can filler comprising a charging chamber mounted on a vertical rotatable shaft, a plurality of circumferentially disposed charging valves mounted in the bottom wall of said chamber and equally spaced apart, a sprocket wheel mounted on said shaft, means to rotate said shaft whereby to cause said sprocket wheel and chamber to rotate with the same angular velocity, a sprocket chain trained over said sprocket, a plurality of equally spaced apart can carriages connected to said chain, each carriage being connected to said chain by means of a tongue swively mounted at its opposite ends to said carriage and chain, a plurality of carriage wheels pivotally mounted on said carriage, a pair of double tracks engaging said wheels and to support said carriages, means including inclined portions along said tracks for raising cans supported on said carriages to engage said valves when said carriages are moved along said tracks, said valves being adapted to be opened when said cans engage said valves and are raised.

6. A milk can filler comprising a charging chamber mounted on a vertical rotatable shaft, a plurality of circumferentially disposed charging valves mounted in the bottom wall of said chamber and equally spaced apart, a sprocket wheel mounted on said shaft, means to rotate said shaft whereby to cause said sprocket wheel and chamber to rotate with the same angular velocity, a sprocket chain trained over said sprocket, a plurality of equally spaced apart can carriages connected to said chain, each carriage being connected to said chain, a plurality of carriage wheels mounted on each carriage, a pair of double tracks engaging said wheels and supporting said carriages, said tracks having inclined portions for raising cans supported on said carriages to engage said valves when said carriages are moved along said tracks, said valves being adapted to be opened when said cans engage said valves and are raised and closed when said cans are lowered and disengaged from said valves.

7. A milk can filler comprising a charging chamber mounted on a vertical rotatable shaft, a plurality of circumferentially disposed charging valves mounted in the bottom wall of said chamber and equally spaced apart, a sprocket wheel mounted on said shaft, means to rotate said shaft whereby to cause said sprocket wheel and chamber to rotate with the same angular velocity, a sprocket chain trained over said sprocket, a plurality of equally spaced apart can carriages connected to said chain, each carriage being connected to said chain by means of a tongue swively mounted at its opposite ends to said carriage and chain, a plurality of carriage wheels pivotally mounted on said carriage, a pair of double tracks engaging said wheels and supporting said carriages, means including inclined portions along said tracks for raising cans supported on said carriages to engage said valves when said carriages are moved along said tracks, said valves having means adapted to be opened when said cans are raised to engage said valves and closed when said cans are lowered and disengaged from said valves.

8. A milk can filler comprising a rotatable charging chamber, a plurality of circumferentially disposed charging valves mounted in the bottom wall of said charging chamber, a pair of double tracks having arcuate portions beneath said rotatable chamber, a conveyor movable along said tracks, and milk can carriages connected to said conveyor and spaced apart to correspond with the spacing of said charging valves, said tracks having inclined portions to raise each of said carriages and a can thereon when they reach a position beneath a charging valve when said chain is caused to travel in unison with said rotatable chamber, and said valves being adapted to be actuated by the upward movement of a can when engaged by the can whereby to allow milk to flow from said chamber into said can when so actuated.

9. A milk can filler comprising a rotatable charging chamber, a plurality of circumferentially disposed charging valves mounted in the bottom wall of said charging chamber, a pair of double tracks having arcuate portions beneath said rotatable chamber, a conveyor movable along said tracks, and milk can carriages connected to said conveyor and spaced apart to correspond with the spacing of said charging valves, said tracks having inclined portions to raise each of said carriages and a can thereon when they reach a position beneath a charging valve when said chain is caused to travel in unison with said rotatable chamber, each of said valves having means adapted to be actuated by the upward movement of a can when engaged by the can whereby to open said valve and allow milk to flow from said chamber into said can and having means adapted to close said valve when a can is disengaged from said valve.

10. A milk can filler comprising a rotatable charging chamber, a plurality of circumferentially disposed charging valves mounted in the bottom wall of said charging chamber, a pair of double tracks having arcuate portions beneath said rotatable chamber, a conveyor movable along said tracks, and milk can carriages connected to said conveyor and spaced apart to correspond with the spacing of said charging valves, said tracks having inclined portions to raise each of said carriages and a can thereon when they reach a position beneath a charging valve when said chain is caused to travel in unison with said rotatable chamber, each of said valves having means adapted to open a valve by the upward movement of a can when engaged by the can whereby to allow milk to flow from said chamber into said can and having means adapted to close said valve when the milk flowing into the can reaches a predetermined level.

11. A milk can filler comprising a rotatable charging chamber, a plurality of circumferentially disposed charging valves mounted in the bottom wall of said charging chamber, a pair of double tracks having arcuate portions beneath said rotatable chamber, a conveyor movable along said tracks, and milk can carriages connected to said conveyor and supported on said tracks and spaced apart to correspond with the spacing of said charging valves, said tracks having inclined portions to raise each of said carriages and a can thereon when they reach a position beneath a charging valve when said chain is caused to travel in unison with said rotatable chamber, each of said valves being adapted to be opened by the upward movement of a can when a carriage is caused to rise on said inclined portions of said tracks to allow milk to flow from said chamber into the can engaged by the valve and each of said valves having means adapted to close the valve when the milk flowing into the can reaches a predetermined level and each of said valves having means to close the valve when a can is disengaged therefrom.

JOSEPH STELLITANO.